US011285849B2

(12) United States Patent
Zimmermann et al.

(10) Patent No.: US 11,285,849 B2
(45) Date of Patent: Mar. 29, 2022

(54) VEHICLE SEAT AND ARMREST ASSEMBLY WITH FREE PLAY MINIMIZATION MECHANISM

(71) Applicant: LEAR CORPORATION, Southfield, MI (US)

(72) Inventors: Bastien Zimmermann, Coventry (GB); Martyn Chee, Coventry (GB); Jem Burgoyne, Coventry (GB)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 16/887,213

(22) Filed: May 29, 2020

(65) Prior Publication Data
US 2021/0370815 A1  Dec. 2, 2021

(51) Int. Cl.
| *B60N 2/75* | (2018.01) |
| *B60N 2/58* | (2006.01) |
| *B60N 2/68* | (2006.01) |
| *B60N 2/90* | (2018.01) |

(52) U.S. Cl.
CPC ............ *B60N 2/773* (2018.02); *B60N 2/58* (2013.01); *B60N 2/68* (2013.01); *B60N 2/757* (2018.02); *B60N 2/767* (2018.02); *B60N 2/919* (2018.02); *B60N 2002/952* (2018.02)

(58) Field of Classification Search
CPC .................................. B60N 2/757; B60N 2/767
See application file for complete search history.

(56) References Cited

U.S. PATENT DOCUMENTS

| 10,279,917 B1* | 5/2019 | Wilkey | B60N 2/797 |
| 2018/0222371 A1* | 8/2018 | Nothroff | B60N 2/793 |

FOREIGN PATENT DOCUMENTS

| DE | 19923668 C1 * | 11/2000 | B60N 2/767 |
| DE | 102009009139 A1 * | 8/2010 | B60N 2/767 |
| DE | 102008030160 B4 * | 5/2012 | B60N 2/767 |
| DE | 102014101996 A1 | 8/2015 | |
| DE | 102016012322 A1 | 4/2018 | |
| DE | 102016122439 A1 | 5/2018 | |
| DE | 102017100697 A1 * | 6/2018 | B60N 2/757 |
| DE | 102017121255 A1 * | 3/2019 | B60N 2/753 |
| DE | 102017220301 A1 * | 5/2019 | B60N 3/10 |
| DE | 202018100651 U1 * | 5/2019 | B60N 2/767 |
| KR | 101482032 B1 * | 1/2015 | |
| KR | 20180039412 A * | 4/2018 | B60N 2/767 |
| WO | WO-2008007678 A1 * | 1/2008 | A47C 7/543 |
| WO | 2018116309 A1 | 6/2018 | |

* cited by examiner

*Primary Examiner* — Timothy J Brindley
(74) *Attorney, Agent, or Firm* — MacMillan, Sobanski & Todd, LLC

(57) ABSTRACT

A seat and armrest assembly includes a seat including a frame having a movable element that is supported on the frame in a position. An armrest is supported on the frame and is movable relative to the seat between a first position and a second position. The armrest includes a locking pin that is disposed adjacent to the movable element of the frame to retain the armrest in the first position. A free play adjustment mechanism is provided to adjust the position of the movable element relative to the frame to minimize or eliminate space between the movable element and the locking pin. The free play adjustment mechanism includes an adjustment actuator having a threaded outer surface that cooperates with a correspondingly threaded inner surface of an aperture extending through the frame.

14 Claims, 7 Drawing Sheets

VEHICLE SEAT AND ARMREST ASSEMBLY WITH FREE PLAY MINIMIZATION MECHANISM

BACKGROUND OF THE INVENTION

This invention relates in general to seats having armrests that are movable between usage and storage positions. In particular, this invention relates to an improved structure for a vehicle seat and armrest assembly that includes a mechanism for minimizing or eliminating free play movement of the armrest relative to the vehicle seat when the armrest is located in the storage position.

Vehicles, such as passenger cars, include various types of seats for supporting occupants thereon. In many instances, the vehicle seat may include one or more armrests that are provided for the comfort of the occupants. For example, a conventional vehicular bench seat includes a center armrest that is located between left and right side seats. In many instances, the armrest is pivotably movable relative to the left and right seats between a lowered usage position and a raised storage position. When located in the lowered usage position, the center armrest extends generally horizontally along respective seat bottom portions of the left and right side seats and is available for use by the occupants. When located in the raised storage position, the center armrest extends generally vertically within a recessed area that is provided between respective seat back portions of the left and right side seats so that an occupant may occupy a center seat of the bench seat.

Some vehicle armrests include a retainer mechanism that deters or prevents the armrest from inadvertently moving out of the usage and/or storage positions. In some instances, this retainer mechanism provides a frictional engagement between adjacent portions of the armrest and the seat back portions of the left and right side seats. In other instances, the retainer mechanism includes a lock that positively prevents movement of the armrest until it has been affirmatively released by the occupant. This type of lock may more securely hold the armrest in place to prevent undesired movement of the armrest caused by a sudden acceleration or deceleration of the vehicle. A release actuator, such as a pivotable handle, may be operated by the occupant in order to release the latch when the occupant desires to move the armrest.

Although known retainer mechanisms have been effective, it would be desirable to provide an improved structure for a seat and armrest assembly that includes a mechanism for minimizing or eliminating free play movement of the armrest relative to the seat when the armrest is located in the storage position.

SUMMARY OF THE INVENTION

This invention relates to an improved structure for a seat and armrest assembly that includes a mechanism for minimizing or eliminating free play movement of the armrest relative to the seat when the armrest is located in a storage position relative to the seat. The seat and armrest assembly includes a seat including a frame having a movable element that is supported on the frame in a position. An armrest is supported on the frame and is movable relative to the seat between a first position and a second position. The armrest includes a locking pin that is disposed adjacent to the movable element of the frame to retain the armrest in the first position. A free play adjustment mechanism is provided to adjust the position of the movable element relative to the frame to minimize or eliminate space between the movable element and the locking pin. The free play adjustment mechanism may include an adjustment actuator having a threaded outer surface that cooperates with a correspondingly threaded inner surface of an aperture extending through the frame.

This invention also relates to a method of manufacturing a seat and armrest assembly. Initially, a seat is provided that includes a frame having a movable element that is supported on the frame in a position. An armrest is provided that is movable relative to the seat between a first position and a second position. The armrest includes a locking pin that is disposed adjacent to the movable element of the frame to retain the armrest in the first position. A free play adjustment mechanism is then adjusted to adjust the position of the movable element relative to the frame to minimize or eliminate space between the movable element and the locking pin. The free play adjustment mechanism may include an adjustment actuator having a threaded outer surface that cooperates with a correspondingly threaded inner surface of an aperture extending through the frame.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
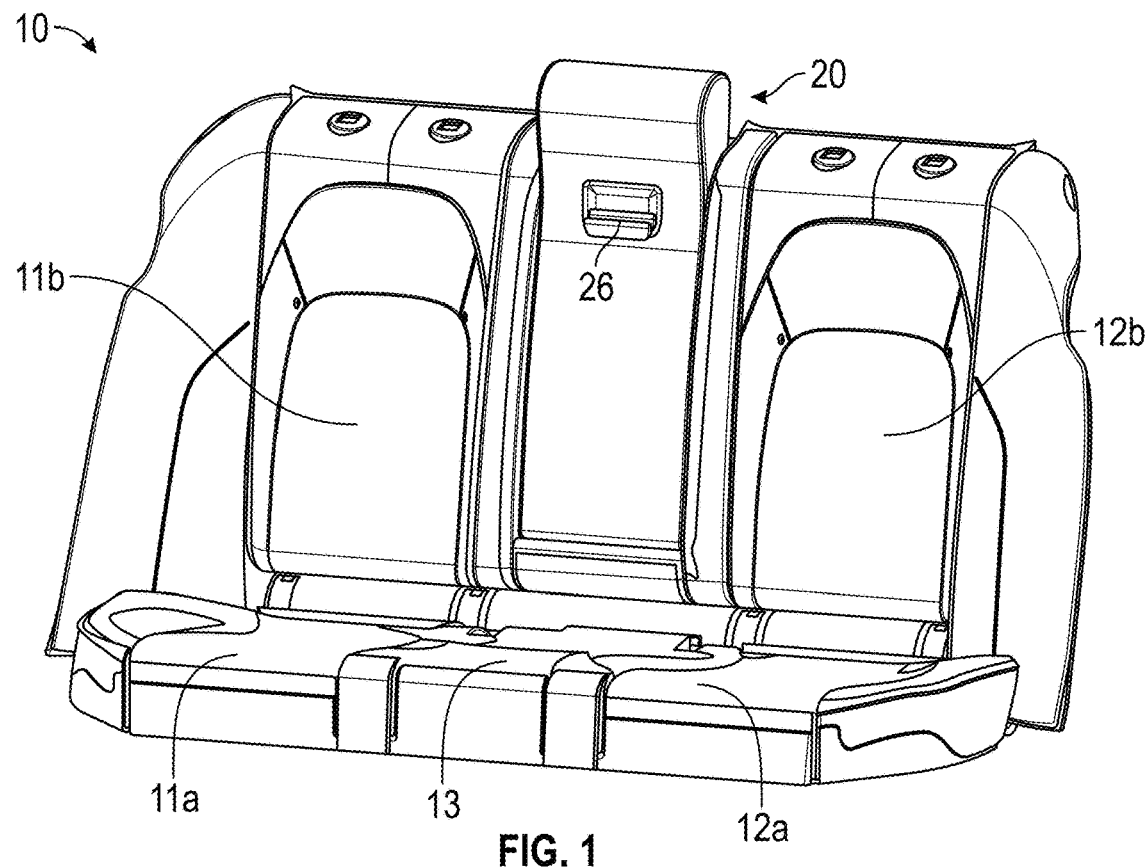
FIG. 1 is a perspective view of a seat and armrest assembly including a mechanism for minimizing or eliminating free play movement of the armrest relative to the seat in accordance with this invention.
Figure 2:
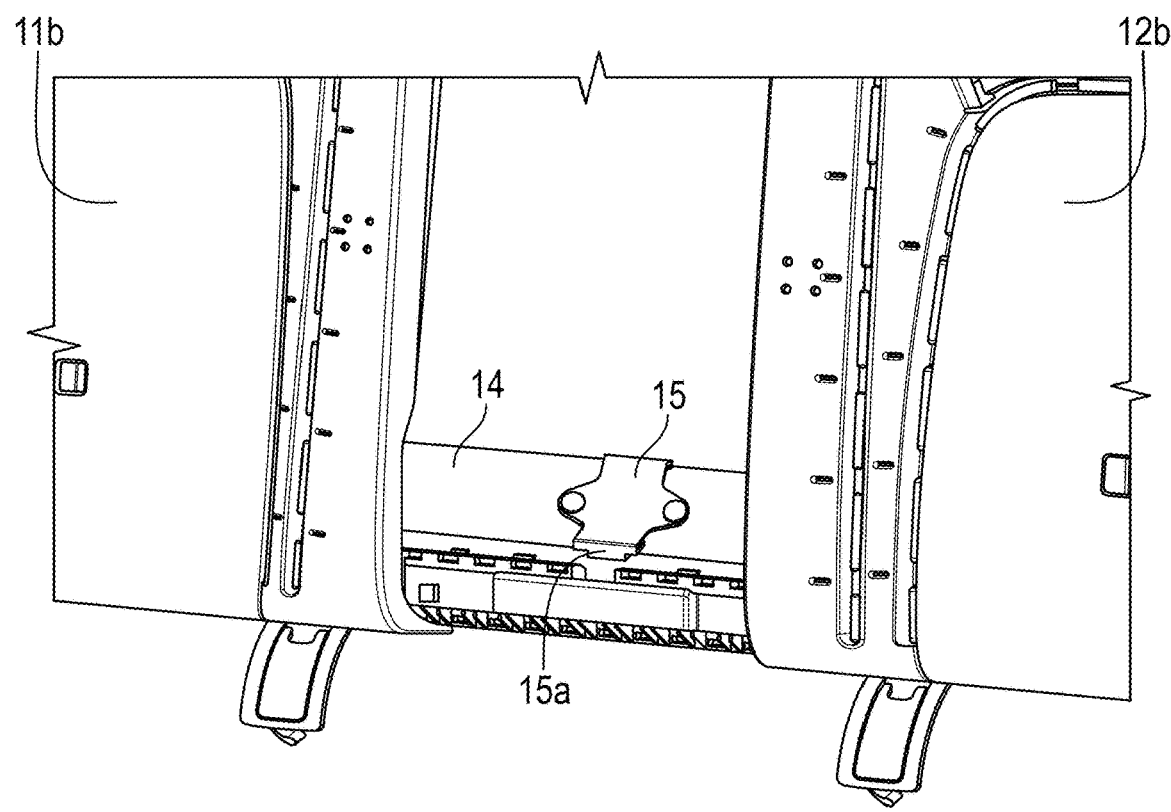
FIG. 2 is an enlarged perspective view of a portion of the seat and armrest assembly illustrated in FIG. 1, wherein the armrest has been removed for clarity.

Referring now to the drawings, there is illustrated in FIGS. 1 and 2 portions of a seat and armrest assembly, indicated generally at 10, in accordance with this invention. The illustrated seat and armrest assembly 10 is, in large measure, conventional in the art and is intended merely to illustrate one environment in which this invention may be used. Thus, the scope of this invention is not intended to be limited for use with the specific structure for the seat and armrest assembly 10 illustrated in FIGS. 1 and 2. On the contrary, as will become apparent below, this invention may be used in any desired environment for the purposes described below.

The illustrated seat and armrest assembly 10 is a conventional vehicle bench seat that includes a left seat bottom 11a, a left seat back 11b, a right seat bottom 12a, and a right seat back 12b. The illustrated seat and armrest assembly 10 also includes a center seat bottom 13 that is located between the left seat bottom 11a and the right seat bottom 12a. As shown in FIG. 2, the illustrated seat and armrest assembly 10 further includes a frame 14 upon which some or all of the left seat bottom 11a, the left seat back 11b, the right seat bottom 12a, the right seat back 12b, and the center seat bottom 13 are supported in a conventional manner. If desired, a pad 15 may be secured to a surface or other portion of the frame 14 for a purpose that will be explained below.

In accordance with this invention, the illustrated seat and armrest assembly 10 includes a center armrest, indicated generally at 20. The illustrated armrest 20 is also supported on the frame 14 (although such is not required) and is pivotably movable between a raised storage position (shown in FIG. 1) and a lowered usage position (not shown). When the armrest 20 is located in the raised storage position shown in FIG. 1, it extends generally vertically within a recessed area (see FIG. 2) that is defined between the left seat back 11b and the right seat back 12b. Thus, the armrest 20 is available as a seat back for an occupant sitting on the center seat bottom 13. When the armrest 20 is located in the lowered usage position, it extends generally horizontally along the center seat bottom 13, with a left side thereof located adjacent to the left seat bottom 11a and a right side thereof located adjacent to the right seat bottom 12a. Thus, the armrest 20 is available for use by occupants sitting on either (or both) of the left seat bottom 11a and the right seat bottom 12a.

As best shown in FIGS. 4 through 7, the armrest 20 includes a retainer assembly, indicated generally at 21, that positively prevents movement of the armrest 20 out of the raised storage position until it has been affirmatively released by a user. The illustrated retainer assembly 21 includes a locking pin 22 that is supported for sliding movement relative to a pin housing 23 that is provided within the armrest 20. The locking pin 22 is movable relative to the pin housing 23 between an extended position (illustrated in FIGS. 4 and 5) and a retracted position (illustrated in FIGS. 6 and 7) for selectively preventing movement of the armrest from the raised storage position. If desired, the retainer assembly 21 may include a spring 24 or other biasing structure that is disposed within the pin housing 23 or otherwise provided for urging the locking pin 22 toward the extended position.

When the locking pin 22 is located in the extended position relative to the pin housing 23, an end 22a of the locking pin 22 extends outwardly from the pin housing 23 and is disposed adjacent to a portion of the frame 14 of the seat and armrest assembly 10. As a result, if the armrest 20 is attempted to be moved from the raised storage position (i.e., pivoted counterclockwise relative to the center seat bottom 13 and the frame 14 when viewing FIGS. 4 through 7) toward the lowered usage position, the end 22a of the locking pin 22 will abut the adjacent portion of the frame 14. Thus, the retainer assembly 21 positively prevents movement of the armrest 20 out of the raised storage position until it has been affirmatively released by an operator. When the locking pin 22 is located in the retracted position, the end 22a of the locking pin 22 does not extend outwardly from the pin housing 23 and, therefore, is not disposed adjacent to the portion of the frame 14 of the seat and armrest assembly 10. As a result, the armrest 20 may be moved from the raised storage position toward the lowered usage position (as shown in FIG. 7).

Figure 3:
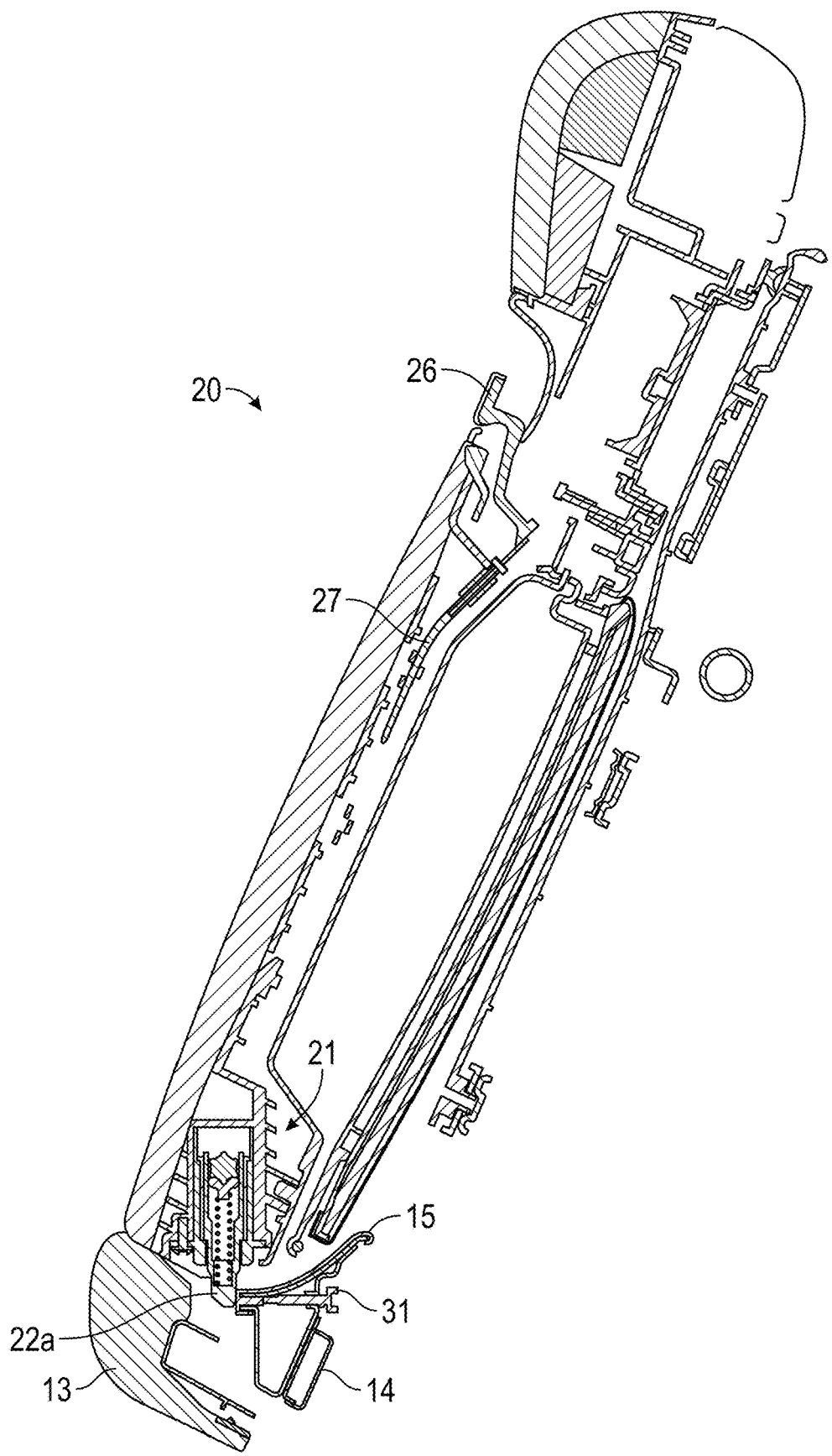
FIG. 3 is a side sectional view of portions of the seat and armrest assembly illustrated in FIG. 1 showing the mechanism for minimizing or eliminating free play movement of the armrest relative to the seat.
Figure 4:
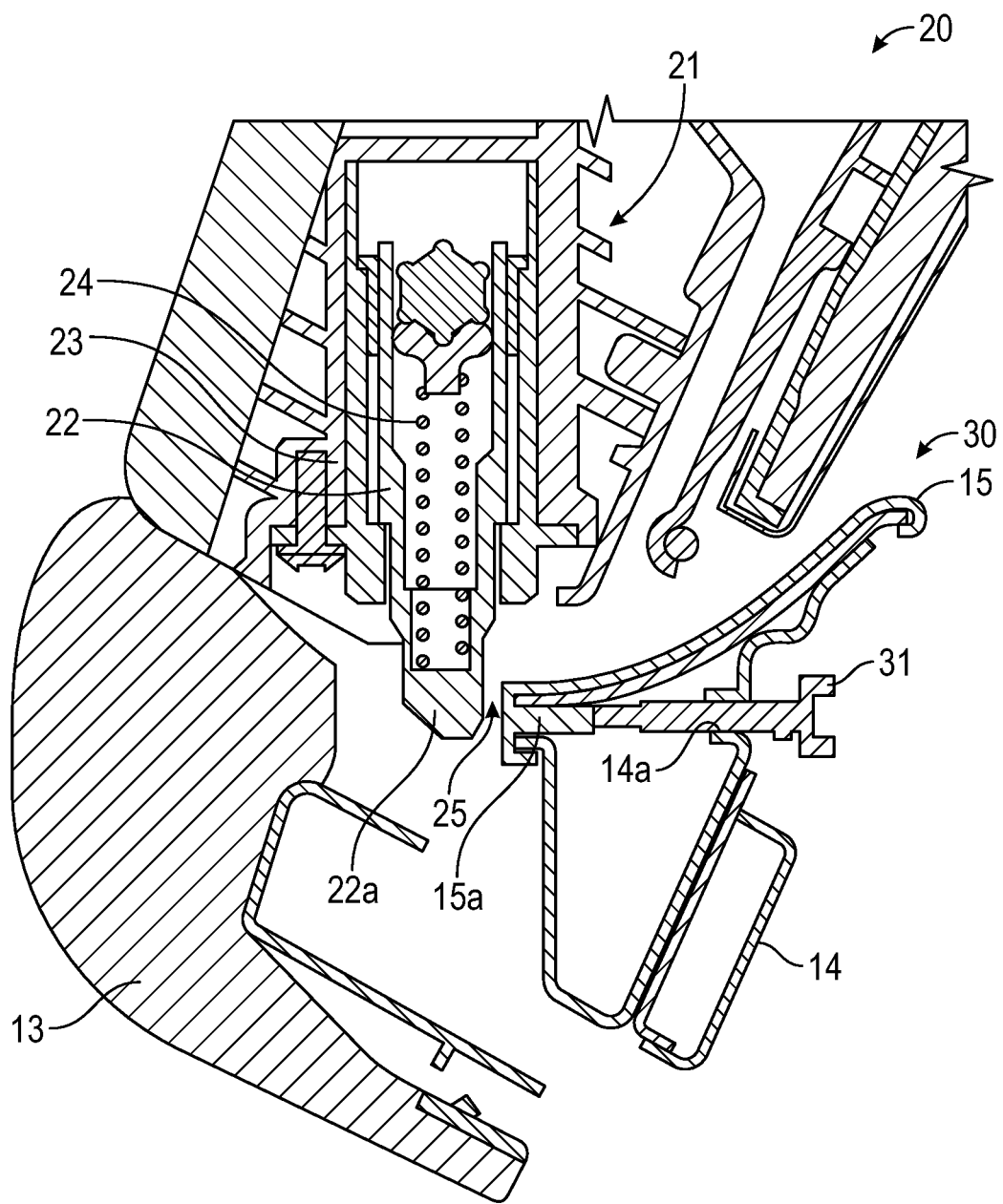
FIG. 4 is an enlarged side sectional view of a lower portion of the seat and armrest assembly illustrated in FIG. 3 showing the armrest in a raised storage position and in a locked condition, and wherein free play exists between the seat and armrest assembly.
Figure 5:
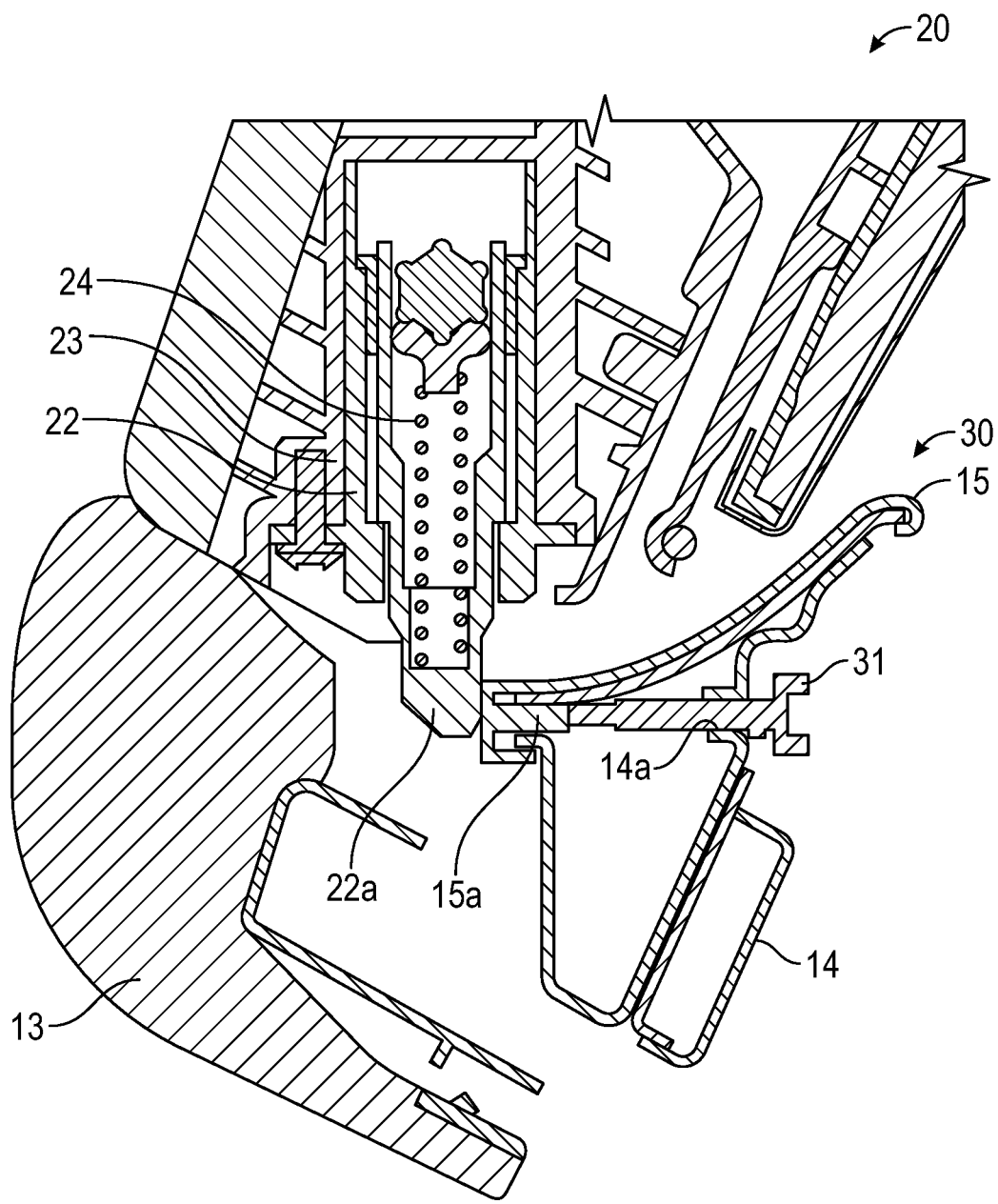
FIG. 5 is an enlarged side sectional view similar to FIG. 4 showing the armrest in a raised storage position and in the locked condition, and wherein free play does not exist between the seat and armrest assembly.
Figure 6:
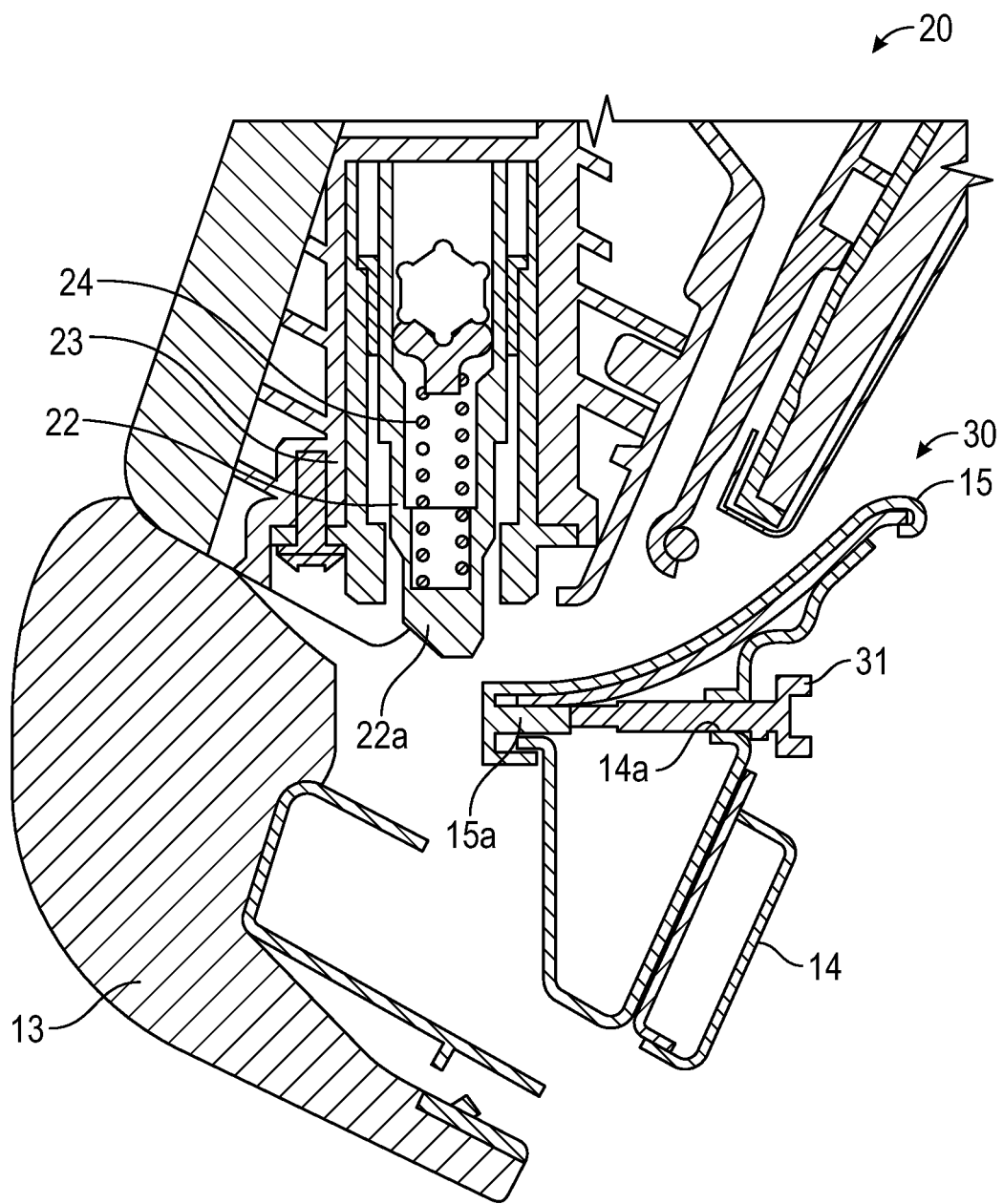
FIG. 6 is an enlarged side sectional view similar to FIG. 5 showing the armrest in a raised storage position and in an unlocked condition.
Figure 7:
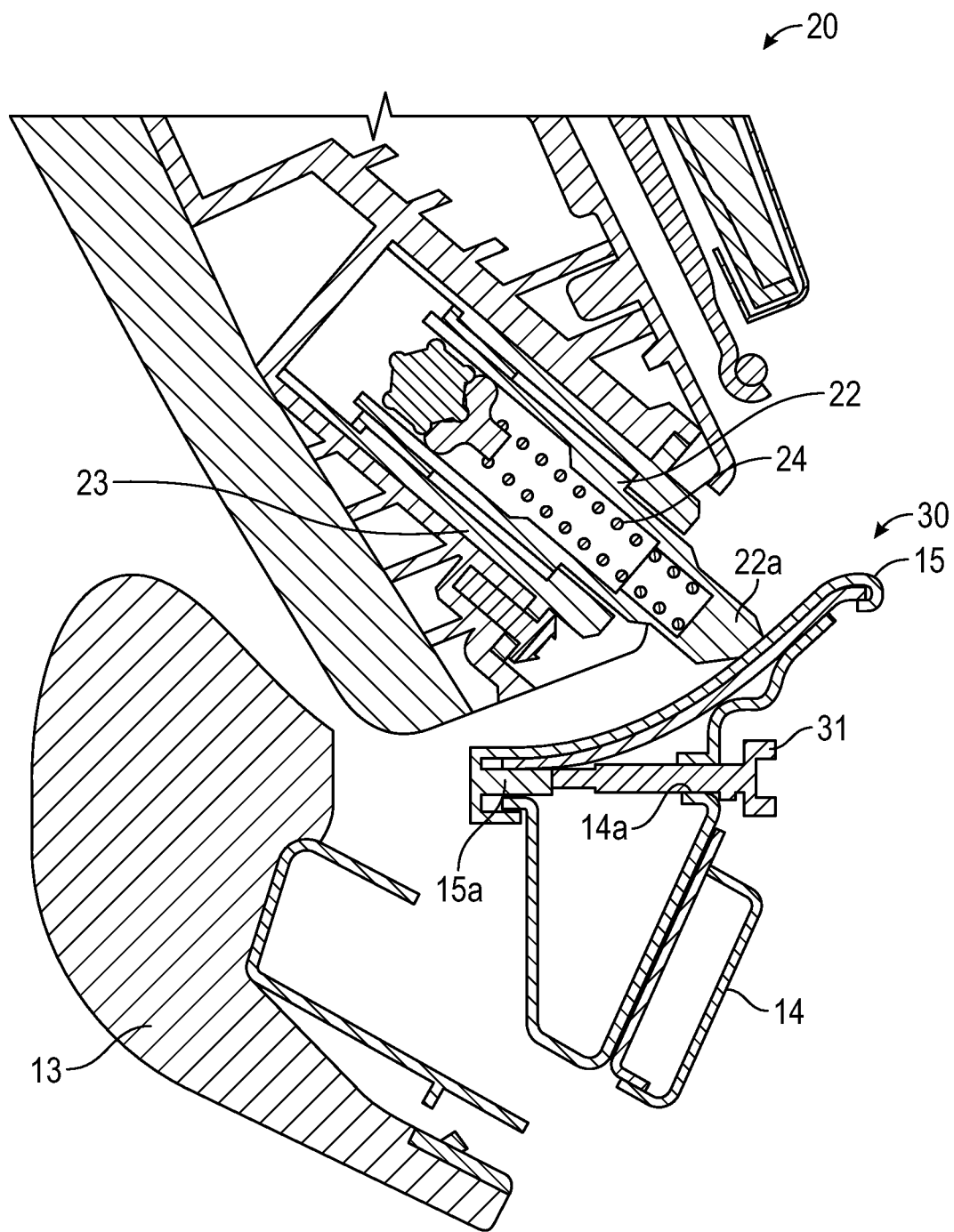
FIG. 7 is an enlarged side sectional view similar to FIG. 6 showing the armrest after being moved out of the raised storage position.

A manually operable mechanism may be provided on the armrest 20 for selectively moving the locking pin 22 from the extended position illustrated in FIGS. 4 and 5 to the retracted position illustrated in FIGS. 6 and 7 against the urging of the spring 24. In the illustrated embodiment, this manually operable mechanism includes a handle 26 (see FIGS. 1 and 3) that is pivotably supported on the armrest 20. The handle 26 is connected through a linkage 27 (a portion of which is shown in FIG. 3) that extends through the armrest 20 to the locking pin 22. In a manner that is well known in the art, the handle 26 may be manually pivoted relative to the armrest 20 by an operator, which causes axial movement of the linkage 27 within the armrest 20. In turn, this axial movement of the linkage 27 moves the locking pin 22 from the extended position illustrated in FIGS. 4 and 5 to the retracted position illustrated in FIGS. 6 and 7 against the urging of the spring 24.

Figure 8:
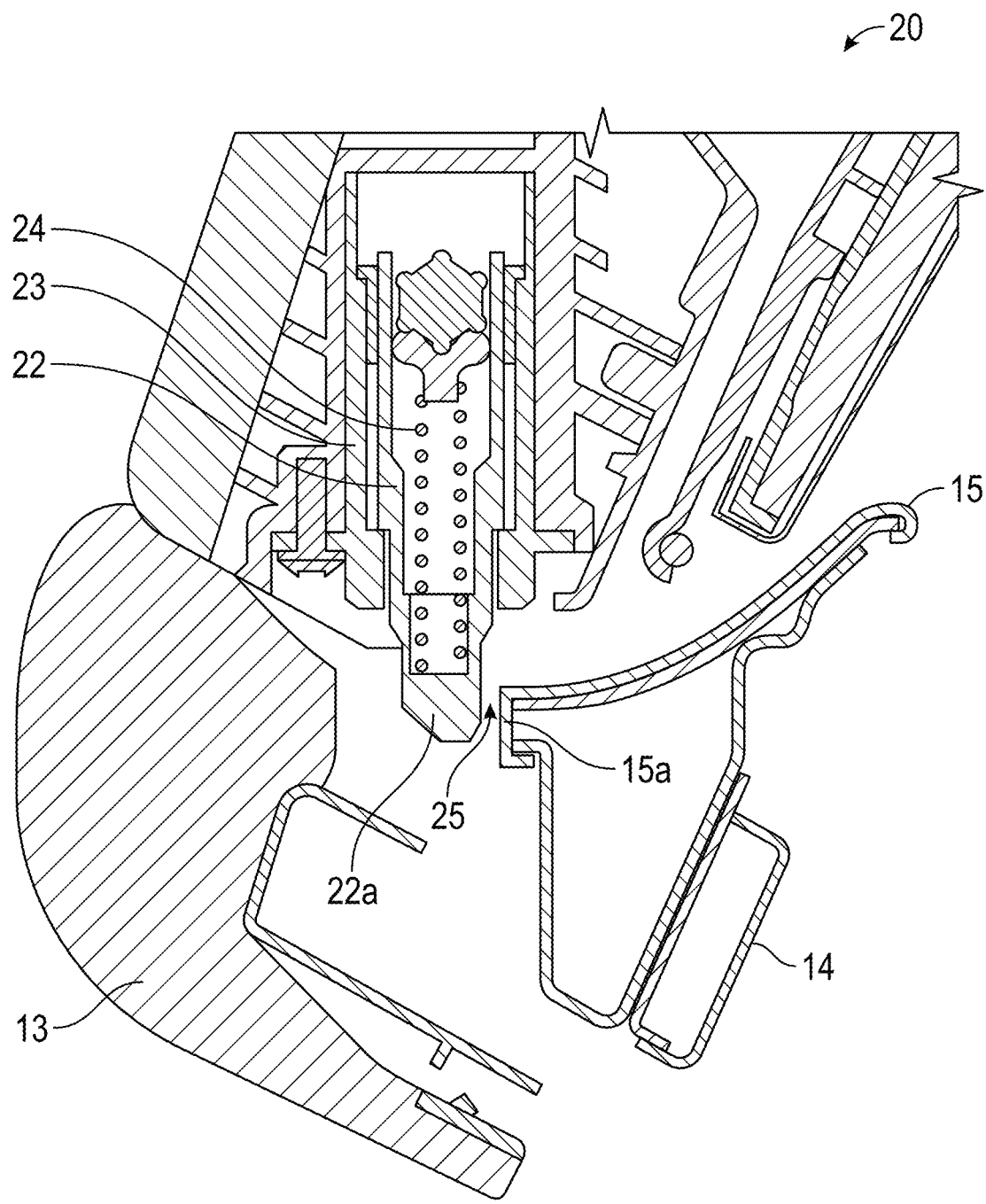
FIG. 8 is an enlarged side sectional view similar to FIG. 4 showing a conventional armrest in a raised storage position and in a locked condition, and wherein free play exists between the seat and armrest assembly.

The structure of the seat and armrest assembly 10 thus far described is conventional in the art. As shown in FIG. 3 (and also in FIG. 8, which illustrates portions of a conventional seat and armrest assembly), a space, indicated generally at 25, may exist between the end 22a of the locking pin 22 and the adjacent portion of the frame 14 when the locking pin 22 is in the extended position. This space 25 may result from the stack-up of manufacturing tolerances in the various components that make up the seat and armrest assembly 10. This space 25 does not have any adverse effect on the ability of the locking pin 22 to effectively retain the armrest 20 in the raised storage position. However, when such a space 25 exists, it may allow the armrest 20 to move a small amount relative to the adjacent left seat back 11b and the right seat back 12b. Such small relative movements may be considered undesirable.

To address this, this invention contemplates that the seat and armrest assembly 10 be provided with a free play minimization mechanism, indicated generally at 30. The illustrated free play minimization mechanism 30 includes an adjustment actuator 31 that is supported on the frame 14 of the seat and armrest assembly 10. As will be explained in detail below, the free play minimization mechanism 30 is provided to reduce or eliminate the space 25 between the end 22a of the locking pin 22 and the adjacent portion of the frame 14 when the locking pin 22 is in the extended position.

In the illustrated embodiment, the adjustment actuator 31 is a conventional bolt having a threaded outer surface that cooperates with a correspondingly threaded inner surface of an aperture 14a extending through a portion of the frame 14 of the seat and armrest assembly 10. Thus, rotation of the adjustment actuator 31 relative to the frame 14 causes axial movement of the adjustment actuator 31 relative to the frame 14. Specifically, clockwise rotation of the adjustment actuator 31 relative to the frame 14 causes axial movement of the adjustment actuator 31 in a first axial direction (from right to left when viewing FIGS. 3 through 7) relative to the frame 14. Conversely, counter-clockwise rotation of the of the adjustment actuator 31 relative to the frame 14 causes axial movement of the adjustment actuator 31 in a second axial direction (from left to right when viewing FIGS. 3 through 7) relative to the frame 14.

The illustrated adjustment actuator 31 has a first end (the right end when viewing FIGS. 3 through 7) that is provided with a feature (such as a slot or a cross, for example) that facilitates the engagement and rotation of the adjustment actuator 31 by a conventional tool (not shown), although such is not required. The illustrated adjustment actuator 31 also has a second end (the left end when viewing FIGS. 3 through 7) opposite the first end that abuts a movable element 15a that, in the illustrated embodiment, is provided on a portion of the pad 15 supported on the frame 14, although again such is not required. When the adjustment actuator 31 is rotated clockwise relative to the frame 14, the second end of the adjustment actuator 31 engages the movable element 15a provided on the portion of the pad 15 and moves the movable element 15a into engagement with the end 22a of the locking pin 22. As a result, the free play minimization mechanism 30 quickly and easily eliminates the space 25 between the end 22a of the locking pin 22 and the adjacent portion of the frame 14 when the locking pin 22 is in the extended position.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat and armrest assembly comprising:
a seat including a frame having a movable element that is supported thereon;
an armrest that is movable relative to the seat between a first position and a second position, the armrest including a locking pin that is disposed adjacent to the movable element supported on the frame to retain the armrest in the first position; and
a free play adjustment mechanism that is adapted to move the movable element relative to the frame to minimize or eliminate space between the movable element and the locking pin.

2. The seat and armrest assembly defined in claim 1 wherein the locking pin is movable between an extended position, wherein the locking pin is disposed adjacent to the movable element, and a retracted position, wherein the locking pin is not disposed adjacent to the movable element.

3. The seat and armrest assembly defined in claim 2 further including a spring that biases the locking pin toward the extended position.

4. The seat and armrest assembly defined in claim 2 further including a mechanism for selectively moving the locking pin from the extended position to the retracted position.

5. The seat and armrest assembly defined in claim 1 wherein the free play adjustment mechanism includes an adjustment actuator that is supported on the frame and is adapted to move the movable element relative to the frame.

6. The seat and armrest assembly defined in claim 5 wherein the adjustment actuator includes a threaded outer surface that cooperates with a correspondingly threaded inner surface of an aperture extending through the frame.

7. The seat and armrest assembly defined in claim 1 further including a pad that is supported on the frame, and wherein the movable element is a portion of the pad.

8. The seat and armrest assembly defined in claim 7 wherein the free play adjustment mechanism includes an adjustment actuator that is supported on the frame and is adapted to move the movable element of the pad relative to the frame.

9. The seat and armrest assembly defined in claim 8 wherein the adjustment actuator includes a threaded outer surface that cooperates with a correspondingly threaded inner surface of an aperture extending through the frame.

10. A method of manufacturing a seat and armrest assembly comprising the steps of:
(a) providing a seat including a frame having a movable element that is supported thereon;
(b) providing an armrest that is movable relative to the seat between a first position and a second position, the armrest including a locking pin that is disposed adjacent to the movable element supported on the frame to retain the armrest in the first position; and
(c) adjusting a free play adjustment mechanism to move the movable element relative to the frame to minimize or eliminate space between the movable element and the locking pin.

11. The method defined in claim 10 wherein the free play adjustment mechanism includes an adjustment actuator that is supported on the frame and is adapted to move the movable element relative to the frame, and wherein step (c) is performed by adjusting the position of the adjustment actuator relative to the frame.

12. The method defined in claim 11 wherein the adjustment actuator includes a threaded outer surface that cooperates with a correspondingly threaded inner surface of an aperture extending through the frame, and wherein step (c) is performed by rotating the adjustment actuator relative to the frame.

13. The method defined in claim 10 further including a pad that is supported on the frame, and wherein step (c) is performed by adjusting the position of the pad on the frame.

14. The method defined in claim 13 wherein the adjustment actuator includes a threaded outer surface that cooperates with a correspondingly threaded inner surface of an aperture extending through the frame, and wherein step (c) is performed by rotating the adjustment actuator relative to the frame.

* * * * *